United States Patent
Kozuka et al.

(10) Patent No.: US 9,508,295 B2
(45) Date of Patent: Nov. 29, 2016

(54) DISPLAY DEVICE

(71) Applicant: Japan Display Inc., Minato-ku (JP)

(72) Inventors: Tomoko Kozuka, Tokyo (JP); Jin Hirosawa, Tokyo (JP); Yuuki Morita, Tokyo (JP); Hiroyuki Kimura, Tokyo (JP); Kazuya Arima, Tokyo (JP); Masaaki Kabe, Tokyo (JP); Yoshihiro Watanabe, Tokyo (JP)

(73) Assignee: Japan Display Inc., Minato-ku (JP)

( * ) Notice: Subject to any disclaimer, the term of this patent is extended or adjusted under 35 U.S.C. 154(b) by 228 days.

(21) Appl. No.: 14/513,610

(22) Filed: Oct. 14, 2014

(65) Prior Publication Data

US 2015/0109568 A1    Apr. 23, 2015

(30) Foreign Application Priority Data

Oct. 18, 2013   (JP) ................. 2013-217439

(51) Int. Cl.
 *G09G 3/36* (2006.01)
 *G02F 1/1343* (2006.01)
 *G02F 1/1337* (2006.01)

(52) U.S. Cl.
 CPC ....... *G09G 3/3607* (2013.01); *G02F 1/134336* (2013.01); *G02F 2001/133742* (2013.01); *G09G 2300/0452* (2013.01); *G09G 2320/0242* (2013.01)

(58) Field of Classification Search
 CPC .............. G09G 3/3607; G09G 2300/0452; G09G 2320/0242
 See application file for complete search history.

(56) References Cited

U.S. PATENT DOCUMENTS

| | | | | |
|---|---|---|---|---|
| 9,177,520 B2* | 11/2015 | Shibata | ........ | G09G 3/3688 |
| 2004/0179160 A1* | 9/2004 | Rhee | ........ | G02F 1/1362 |
| | | | | 349/139 |
| 2007/0152930 A1* | 7/2007 | Jin | ........ | G02F 1/1323 |
| | | | | 345/87 |
| 2012/0320096 A1* | 12/2012 | Small | ........ | G09G 3/2003 |
| | | | | 345/690 |
| 2013/0082998 A1* | 4/2013 | Knausz | ........ | G09G 3/3696 |
| | | | | 345/212 |
| 2014/0168289 A1* | 6/2014 | Shibata | ........ | G09G 3/3688 |
| | | | | 345/690 |
| 2014/0231790 A1 | 8/2014 | Fujino | | |

FOREIGN PATENT DOCUMENTS

| | | |
|---|---|---|
| JP | 2006-259135 | 9/2006 |
| JP | 2013-80584 | 5/2013 |

* cited by examiner

*Primary Examiner* — Gene W Lee
(74) *Attorney, Agent, or Firm* — Oblon, McClelland, Maier & Neustadt, L.L.P.

(57) ABSTRACT

According to one embodiment, a display device includes a first substrate including a first pixel electrode disposed on a first color pixel of red, a second pixel electrode disposed on a second color pixel of green, a third pixel electrode disposed on a third color pixel of blue, and a fourth pixel electrode disposed on a fourth color pixel of white, a second substrate including a common electrode, and a liquid crystal layer held between the first substrate and the second substrate, wherein a top voltage applied to the fourth color pixel to correspond to a maximum gradation value is set to be less than a top voltage applied to each of the first color pixel and the second color pixel to correspond to respective maximum gradation values.

18 Claims, 9 Drawing Sheets

DISPLAY DEVICE

CROSS-REFERENCE TO RELATED APPLICATIONS

This application is based upon and claims the benefit of priority from Japanese Patent Application No. 2013-217439, filed Oct. 18, 2013, the entire contents of which are incorporated herein by reference.

FIELD

Embodiments described herein relate generally to a display device.

BACKGROUND

Methods for improving display luminance in color display devices have been proposed. As an example, there is a liquid crystal display device in which one unit pixel is constituted by arranging a red (R) color pixel, a green color (G) pixel, a blue color (B) pixel and a white color (W) pixel in a row direction in a predetermined order.

In recent years, liquid crystal display devices with a vertical alignment (VA) mode and an in-plane switching (IPS) mode are developed. In the VA mode, liquid crystal molecules are aligned vertically in the initial state and then inclined while a voltage is being applied thereto in order to vary birefringence. The VA mode realizes transmittance (white) and non-transmittance (black) using this birefringence varied by the inclination. In the IPS mode, liquid crystal molecules are aligned in-plane to be parallel with a substrate major surface in the initial state and then rotated in-plane while a voltage is being applied thereto in order to vary birefringence. The IPS mode realizes transmittance (white) and non-transmittance (black) using this birefringence varied by the rotation.

In the VA mode, the liquid crystal molecules between pixels of different colors do not change their original inclination significantly as compared to the IPS mode. Thus, the VA mode can narrow down the light shielding widths between the color pixels for higher aperture ratio and luminescence. On the other hand, optical rotatory dispersion or wavelength dispersion in the liquid crystal layer affects pixel hues in accordance with the inclination of the liquid crystal molecules. When a unit pixel is composed of general three color pixels of red, green and blue, a voltage value of each of red color pixel, green color pixel, and blue color pixel is adjusted to correspond to gradation values for achieving a chromaticity maintaining a white balance. However, when a unit pixel is composed of four color pixels of red, green, blue and white, a blue shift phenomenon in which the hue of the white color pixel changes bluish appears conspicuously, and a sufficient chromaticity adjustment in three color pixels of red, green and blue becomes difficult.

DETAILED DESCRIPTION

In general, according to one embodiment, a display device includes: a first substrate including a first pixel electrode disposed on a first color pixel of red, a second pixel electrode disposed on a second color pixel of green, a third pixel electrode disposed on a third color pixel of blue, and a fourth pixel electrode disposed on a fourth color pixel of white; a second substrate including a common electrode which is opposed to the first, second, third, and fourth pixel electrodes; and a liquid crystal layer held between the first substrate and the second substrate, wherein a top voltage applied to the fourth color pixel to correspond to a maximum gradation value is set to be less than a top voltage applied to each of the first color pixel and the second color pixel to correspond to respective maximum gradation values.

According to another embodiment, display device includes: a first substrate including a first common electrode, an interlayer insulating film covering the first common electrode, a first pixel electrode disposed on a first color pixel of red on the interlayer insulating film, a second pixel electrode disposed on a second color pixel of green in the interlayer insulating film, a third pixel electrode disposed on a third color pixel of blue on the interlayer insulating film, and a fourth pixel electrode disposed on a fourth color pixel of white on the interlayer insulating film; a second substrate including a second common electrode which is opposed to the first pixel electrode, the second pixel electrode, the third pixel electrode, and the fourth pixel electrode; and a liquid crystal layer held between the first substrate and the second substrate, wherein a top voltage applied to the fourth color pixel to correspond to a maximum gradation value is set to be less than a top voltage applied to each of the first color pixel and the second color pixel to correspond to respective maximum gradation values.

Embodiments will now be described in detail with reference to the accompanying drawings. In the drawings, structural elements having the same or similar functions are denoted by like reference numbers, and an overlapping description is omitted.

Figure 1:
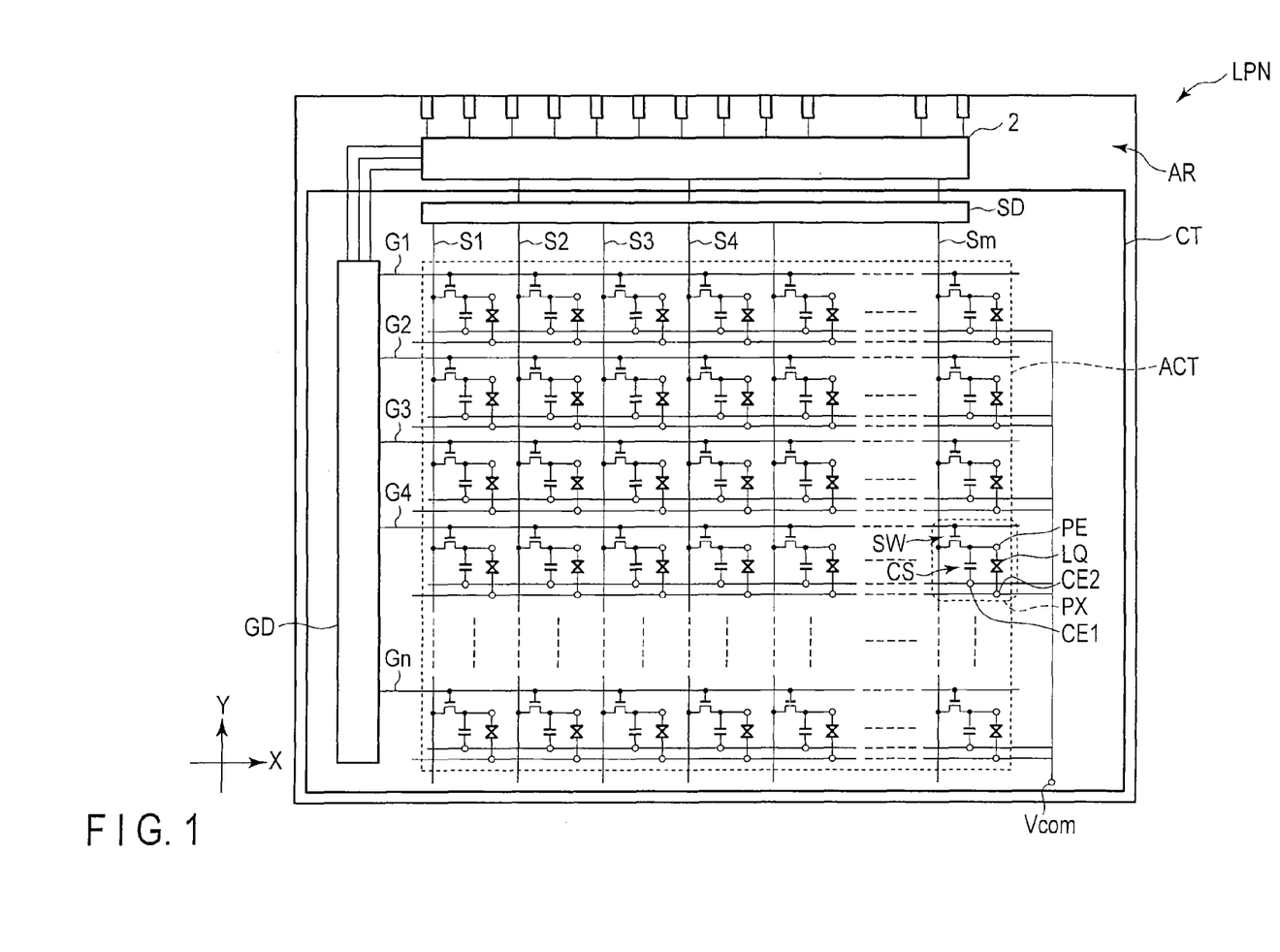
FIG. 1 is a view which schematically illustrates a structure and an equivalent circuit of a liquid crystal display panel LPN which constitutes a display device according to an embodiment.

FIG. 1 is a view which schematically illustrates a structure and an equivalent circuit of a liquid crystal display panel LPN which constitutes a display device according to an embodiment.

Specifically, the display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT corresponds to a region where the liquid crystal layer LQ is held between the array substrate AR and the counter-substrate CT, has a rectangular shape, for instance, and is composed of a plurality of pixels PX which are arrayed in a matrix.

The array substrate AR includes, in the active area ACT, a plurality of gate lines G (G1 to Gn) extending in a first direction X, a plurality of source lines S (S1 to Sm) extending in a second direction Y crossing the first direction X, a switching element SW which is electrically connected to the gate line G and source line S in each pixel PX, a pixel electrode PE which is electrically connected to the switching element SW in each pixel PX, and a first common electrode CE1 which is opposed to the pixel electrode PE. A storage capacitor CS is formed, for example, between the first common electrode CE1 and the pixel electrode PE.

On the other hand, the counter-substrate CT includes, for example, a second common electrode CE2 which is opposed to the pixel electrode PE via the liquid crystal layer LQ.

Each of the gate lines G is led out to the outside of the active area ACT and is connected to a first driving circuit GD. Each of the source lines S is led out to the outside of the active area ACT and is connected to a second driving circuit SD. At least parts of the first driving circuit GD and second driving circuit SD are formed on, for example, the array substrate AR, and are connected to a driving IC chip 2. The driving IC chip 2 incorporates a controller which controls the first driving circuit GD and second driving circuit SD, and functions as a signal supply source for supplying necessary signals for driving the liquid crystal display panel LPN. In the example illustrated, the driving IC chip 2 is mounted on the array substrate AR, on the outside of the active area ACT of the liquid crystal display panel LPN.

The driving IC chip 2 stores a controller for the first driving circuit GD and the second driving circuit SD and functions as a signal supply source which supplies necessary signals for driving the liquid crystal display panel LPN. The driving IC chip 2 further functions as a voltage applier which applies a voltage to each pixel PX, specifically, each pixel PX color by color to correspond to gradation values. The driving IC chip 2 stores, for example, a memory which memorizes a voltage range set for each color pixel and a voltage value allocated to each gradation value within the voltage range. Both the bottom voltage and the top voltage of the utilizable voltage range are set based on a V-T characteristic which is an applied voltage relative to a transmittance of each color pixel. The voltage value of each gradation value is allocated within the set voltage range. Note that the voltage range and the voltage value of each gradation value may be stored in a different memory instead of such a driving IC chip.

The first common electrode CE1 and second common electrode CE2 have the same potential, and each of them extends over substantially the entirety of the active area ACT and is formed commonly over a plurality of pixels PX. The first common electrode CE1 and second common electrode CE2 are led out to the outside of the active area ACT and are connected to a power supply module Vcom. The power supply module Vcom is formed, for example, on the array substrate AR on the outside of the active area ACT, and is electrically connected to the first common electrode CE1 and also electrically connected to the second common electrode CE2 via an electrically conductive member (not shown). At the power supply module Vcom, for example, a common potential is supplied to the first common electrode CE1 and second common electrode CE2.

Figure 2:
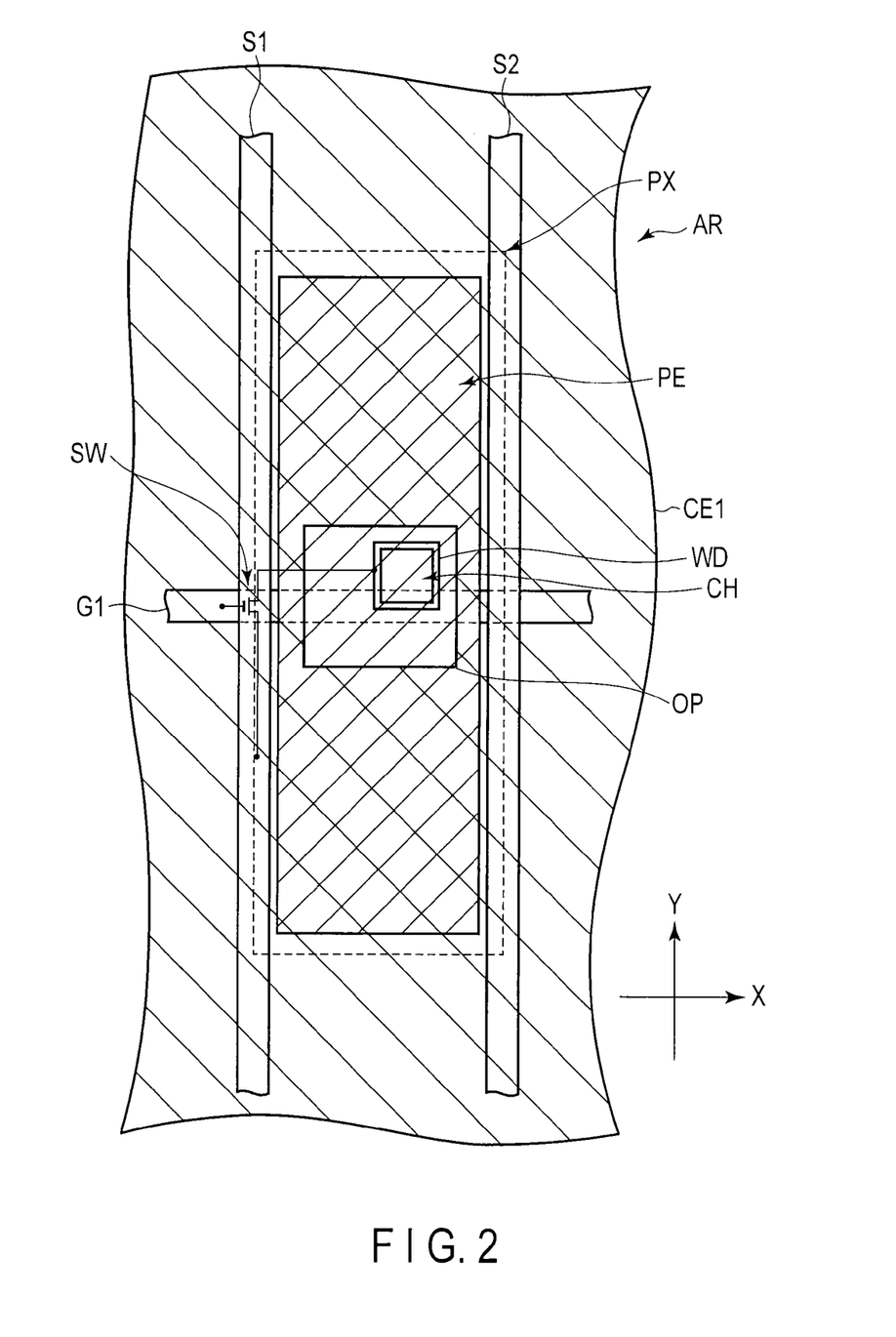
FIG. 2 is a plan view which schematically illustrates a structure example of one pixel PX of an array substrate AR which is applicable to the display device of the embodiment.

FIG. 2 is a plan view which schematically shows a structure example of one pixel PX of the array substrate AR which is applicable to the display device of the embodiment.

The array substrate AR includes a gate line G1, a source line S1, a source line S2, a switching element SW, a first common electrode CE1, and a pixel electrode PE, etc. In the example illustrated, as indicated by a broken line in FIG. 2, the pixel PX has a rectangular shape with a pair of short sides parallel to the first direction X, and a pair of long sides parallel to the second direction Y.

The gate line G1 extends linearly in the first direction X. The source line S1 and source line S2 are disposed with a distance in the first direction X, and extend linearly in the second direction Y, respectively. The length of the pixel PX in the first direction X is substantially equal to the pitch of neighboring source lines in the first direction X. The length of the pixel PX in the second direction Y is substantially equal to the pitch of neighboring gate lines in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line G1 is disposed in a manner to cross a central portion of the pixel PX. In the present embodiment, as illustrated, there is no storage capacitance line which crosses the pixel PX for forming a storage capacitance CS.

The switching element SW is composed of, for example, an n-channel thin-film transistor (TFT). Although a detailed illustration is omitted, the switching element SW includes a semiconductor layer of, e.g. polysilicon, a gate electrode electrically connected to the gate line G1, a source electrode which is connected to the source line S1 and is put in contact with the semiconductor layer, and a drain electrode WD which is in contact with the semiconductor layer.

For example, as indicated by lower-right hatching lines in the Figure, the first common electrode CE1 is disposed over substantially the entirety of the pixel PX, and further extends from the pixel PX beyond the source line S1 and source line S2 in the first direction X and extends in the second direction Y. Specifically, the first common electrode CE1 is opposed to the source line S1 and source line S2 and is formed continuously over pixels neighboring the pixel PX in the first direction X. In addition, the first common electrode CE1 is formed continuously over pixels neighboring the pixel PX in the second direction Y. Furthermore, although not described in detail, the first common electrode CE1 is disposed over substantially the entirety of the active area which displays an image, and a part thereof is led out to the outside of the active area and electrically connected to the power supply module, as described above. It should be noted, however, that an opening OP for exposing the drain electrode WD is formed in the first common electrode CE1.

In the meantime, the first common electrode CE1 may be formed such that, while the first common electrode CE1 is disposed over substantially the entirety of the pixel PX, the first common electrode CE1 is made discontinuous at an area overlapping the gate line G1, the first common electrode CE1 extends from the pixel PX over the source line S1 and source line S2 in the first direction X, the first common electrode CE1 is opposed to the source line S1 and source line S2, and the first common electrode CE1 is continuously formed in a strip shape over pixels neighboring the pixel PX in the first direction X. In this case, too, the first common electrode CE1 is led out to the outside of the active area which displays an image, and is electrically connected to the power supply module, as described above.

As indicated by upper-right hatching lines in the Figure, the pixel electrode PE is formed in an island shape in the pixel PX, and is opposed to the first common electrode CE1. Incidentally, in the example illustrated, although only the pixel electrode PE disposed in the pixel PX is depicted, pixel electrodes are also disposed in other pixels neighboring the pixel PX in the first direction X and second direction Y. The pixel electrode PE is electrically connected to the drain electrode WD of the switching element SW via a contact hole CH. The shape of the pixel electrode PE illustrated corresponds to, for example, the shape of the pixel PX, and is a rectangular shape having a less length in the first direction X than in the second direction Y. The contact hole CH is located at a substantially central part of the pixel electrode PE. Incidentally, a part of the pixel electrode PE may extend to positions overlapping the source line S1 and source line S2.

In the present embodiment, the structure of each pixel of the active area is identical to the above-described structure example. However, the active area may include pixels of different pixel sizes, i.e. different lengths in the first direction X and second direction Y.

Figure 3:
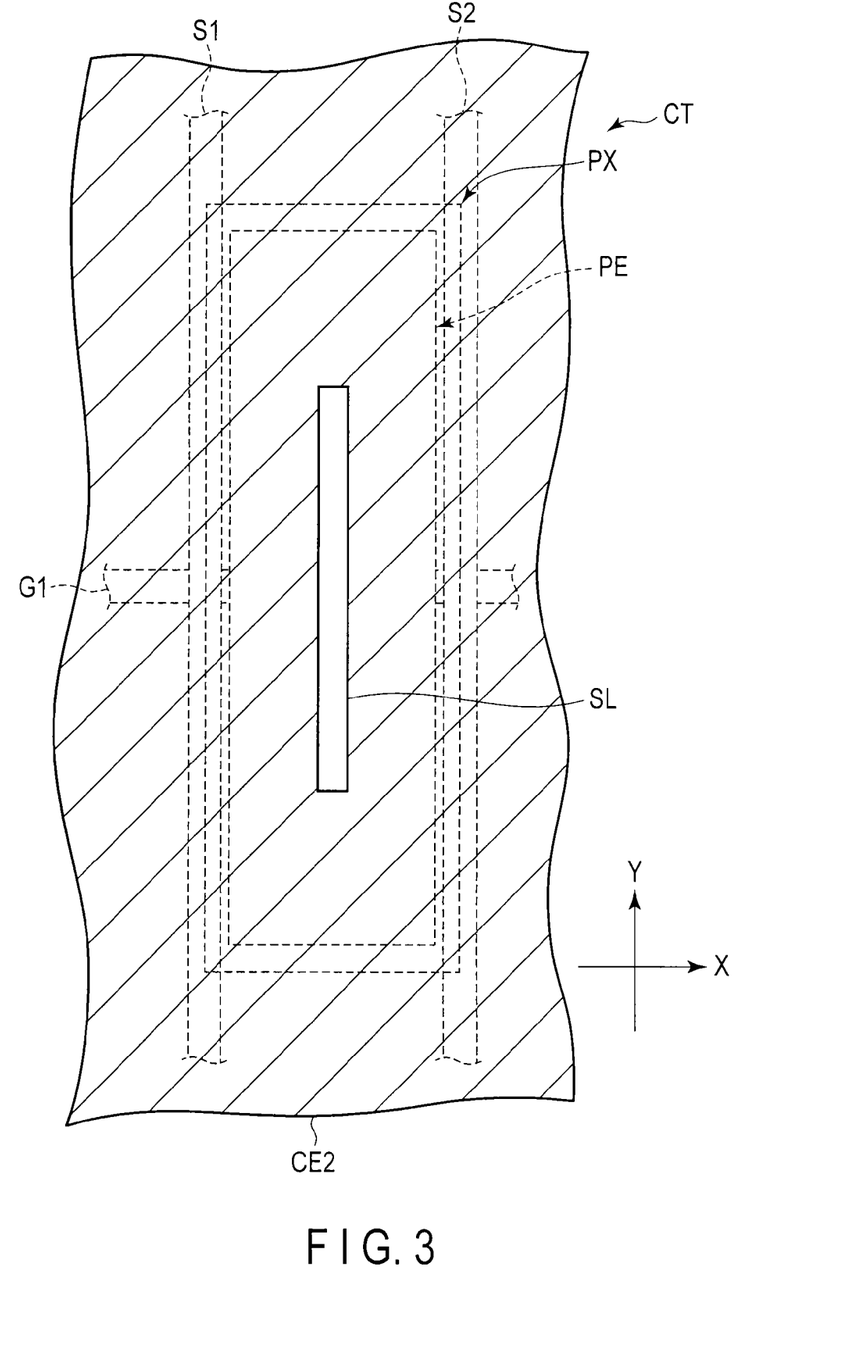
FIG. 3 is a plan view which schematically illustrates a structure example of one pixel PX of a counter-substrate CT which is applicable to the display device of the embodiment.

FIG. 3 is a plan view which schematically shows a structure example of one pixel PX of the counter-substrate CT which is applicable to the display device of the embodiment. FIG. 3 shows only structural parts that are necessary for the description, and the source line S1, source line S2, gate line G1, and pixel electrode PE, which are main parts of the array substrate, are indicated by broken lines, and the depiction of the first common electrode is omitted.

The counter-substrate CT includes a second common electrode CE2. The second common electrode CE2 is disposed in the pixel PX, and is opposed to the pixel electrode PE. In addition, the second common electrode CE2 extends from the pixel PX in the first direction X and the second direction Y, and is located also above the source line S1 and source line S2. Specifically, although not described in detail, the second common electrode CE2 is disposed continuously over pixels neighboring on the right side and left side along the first direction X of the pixel PX, and pixels neighboring on the upper side and lower side along the second direction Y of the pixel PX. Furthermore, although not described in detail, the second common electrode CE2 is disposed over almost the entirety of the active area.

A slit SL is formed in the second common electrode CE2 at a position opposed to the pixel electrode PE. In the example illustrated, the slit SL is formed in a strip shape extending in the second direction Y, and is located at a substantially central part of the pixel PX. Such a slit SL functions mainly as an alignment controller which controls the alignment of the liquid crystal molecules. The alignment controller is not limited to such a slit and, as long as it controls the alignment of liquid crystal molecules, the alignment controller can be formed arbitrarily, namely a projection on the second common electrode CE2 and the like. Furthermore, the shape of the slit SL is not limited to the example illustrated and may be formed in a cross shape.

Figure 4:
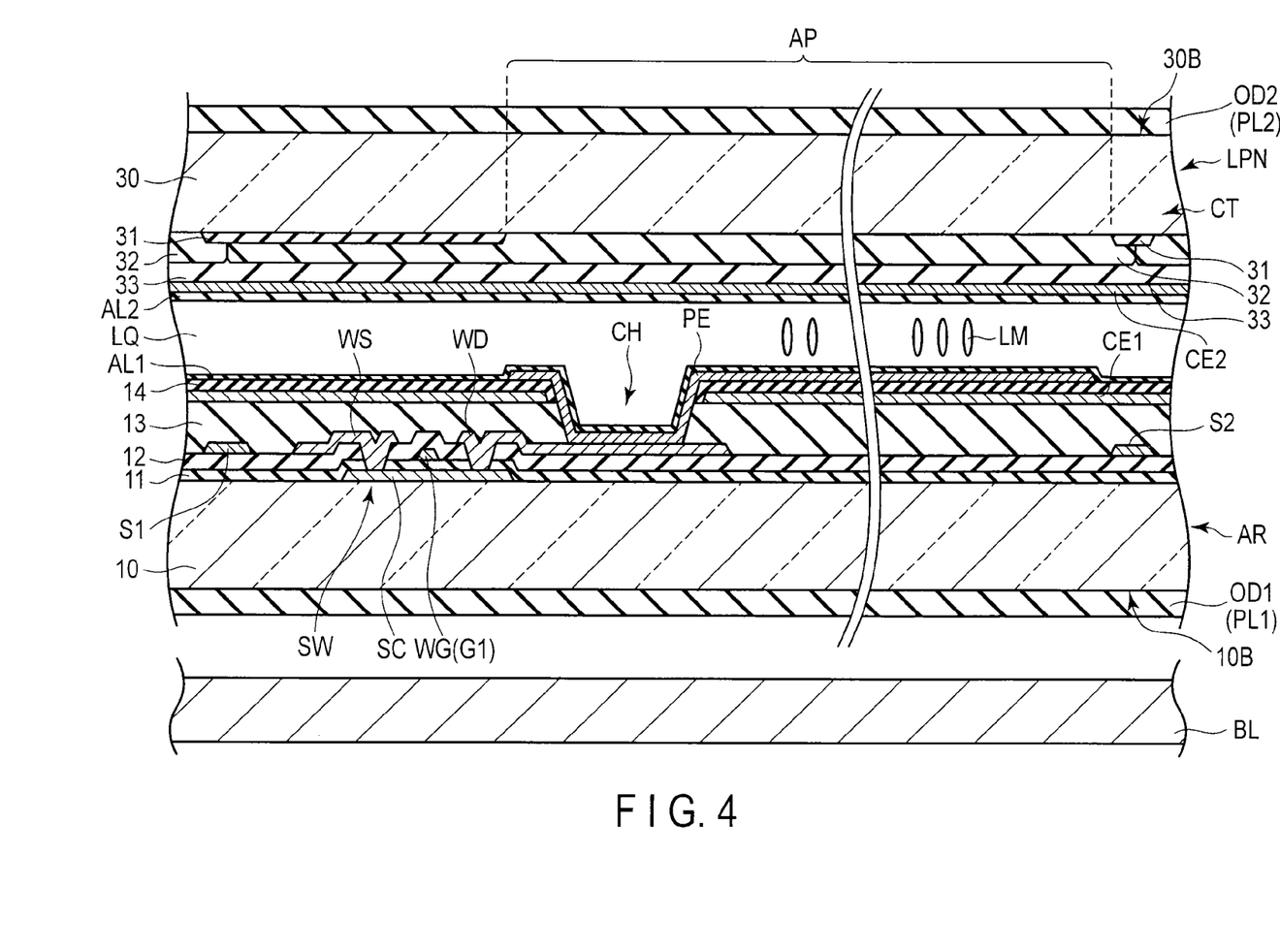
FIG. 4 is a view which schematically illustrates a cross-sectional structure of the liquid crystal display panel LPN in an active area including a switching element SW shown in FIG. 2.

FIG. 4 is a view which schematically illustrates a cross-sectional structure of the liquid crystal display panel LPN in the active area including the switching element SW shown in FIG. 2.

The array substrate AR is formed by using a first insulative substrate 10 having light transmissivity, such as a glass substrate or a resin substrate. The array substrate AR includes, on that side of the first insulative substrate 10, which is opposed to the counter-substrate CT, a switching element SW, a first common electrode CE1, a pixel electrode PE, a first insulating film 11, a second insulating film 12, a third insulating film 13, a fourth insulating film 14, and a first vertical alignment film AL1, etc.

In the example illustrated, the switching element SW is a thin-film transistor of a top gate type. The switching element SW includes a semiconductor layer SC which is disposed on the first insulative substrate 10. In the meantime, an undercoat layer, which is an insulating film, may be interposed between the first insulative substrate 10 and the semiconductor layer SC. The semiconductor layer SC is covered with the first insulating film 11. The first insulating film 11 is also disposed on the first insulative substrate 10. This first insulating film 11 is formed of, for example, an inorganic material such as silicon nitride.

A gate electrode WG of the switching element SW is formed on the first insulating film 11, and is located immediately above the semiconductor layer SC. The gate electrode WG is electrically connected to the gate line G1 (or formed integral with the gate line G1) and is covered with the second insulating film 12. The second insulating film 12 is also disposed on the first insulating film 11. This second insulating film 12 is formed of, for example, an inorganic material such as tetraethoxysilane (TEOS).

A source electrode WS and a drain electrode WD of the switching element SW are formed on the second insulating film 12. The source line S1 and source line S2 are similarly formed on the second insulating film 12. The source electrode WS illustrated is electrically connected to the source line S1 (or formed integral with the source line S1). The source electrode WS and drain electrode WD are put in contact with the semiconductor layer SC via contact holes penetrating the first insulating film 11 and second insulating film 12. The switching element SW with this structure, as well as the source line S1 and source line S2, is covered with the third insulating film 13. The third insulating film 13 is also disposed on the second insulating film 12. This third insulating film 13 is formed of, for example, a transparent resin material.

The first common electrode CE1 extends over the third insulating film 13. As illustrated in the Figure, the first common electrode CE1 covers the upper side of the source line S1 and source line S2, and extends toward neighboring pixels. The first common electrode CE1 is formed of a transparent, electrically conductive material such as indium tin oxide (ITO) or indium zinc oxide (IZO). The fourth insulating film 14 is disposed on the first common electrode CE1. A contact hole CH, which penetrates to the drain electrode WD, is formed in the third insulating film 13 and fourth insulating film 14. The fourth insulating film 14 has a less thickness than the third insulating film 13, and is formed of, for example, an inorganic material such as silicon nitride. The fourth insulating film 14 corresponds to an interlayer insulating film which covers the first common electrode CE1.

The pixel electrode PE is formed in an island shape on the fourth insulating film 14 and is opposed to the first common electrode CE1. The pixel electrode PE is electrically connected to the drain electrode WD of the switching element SW via the contact hole CH. This pixel electrode PE is formed of a transparent, electrically conductive material such as ITO or IZO. The pixel electrode PE is covered with the first vertical alignment film AL1.

On the other hand, the counter-substrate CT is formed by using a second insulative substrate 30 with light transmissivity, such as a glass substrate or a resin substrate. The counter-substrate CT includes, on that side of the second insulative substrate 30, which is opposed to the array substrate AR, a light-shield layer 31, color filters 32, an overcoat layer 33, a second common electrode CE2, and a second vertical alignment film AL2.

The light-shield layer 31 partitions each pixel PX in the active area ACT, and forms an aperture portion AP. The light-shield layer 31 is provided at boundaries between color pixels, or at positions opposed to the source lines provided on the array substrate AR. The light-shield layer 31 is formed of a light-shielding metallic material or a black resin material.

The color filter 32 is formed in the aperture portion AP, and a part thereof overlaps the light-shield layer 31. The color filters 32 include a red color filter formed of a resin material which is colored in red, a green color filter formed of a resin material which is colored in green, and a blue color filter formed of a resin material which is colored in blue. The red color filter is disposed in a red color pixel which displays red, the green color filter is disposed in a green color pixel which displays green, and the blue color filter is disposed in a blue color pixel which displays blue. In addition, a white (or transparent) color filter is disposed in a white color pixel which displays white. Incidentally, no color filter may be disposed in the white color pixel. Besides, the white color filter may not strictly be an achromatic color filter, and may be a color filter which is lightly colored (e.g. colored in light yellow). Boundaries between the color filters 32 of different colors are located at positions overlapping the light-shield layer 31 above the source lines S.

The overcoat layer 33 covers the color filters 32. The overcoat layer 33 planarizes asperities of the light-shield layer 31 and color filters 32. The overcoat layer 33 is formed of, for example, a transparent resin material. This overcoat layer 33 serves as an underlayer of the second common electrode CE2.

The second common electrode CE2 is formed on that side of the overcoat layer 33, which is opposed to the array substrate AR. As illustrated in the Figure, the second common electrode CE2 extends above the source line S1 and source line S2, and extends toward the neighboring pixels. The second common electrode CE2 is formed of, for example, a transparent, electrically conductive material such as ITO or IZO. The second common electrode CE2 is covered with the second vertical alignment film AL2.

The first vertical alignment film AL1 and second vertical alignment film AL2 are formed of a material which exhibits vertical alignment properties, and have an alignment restriction force which aligns liquid crystal molecules in a normal direction of the substrate, without requiring alignment treatment such as rubbing.

The above-described array substrate AR and counter-substrate CT are disposed such that their first vertical alignment film AL1 and second vertical alignment film AL2 are opposed to each other. In this case, a predetermined cell gap is created between the array substrate AR and the counter-substrate CT by columnar spacers which are formed on one of the array substrate AR and counter-substrate CT. The array substrate AR and counter-substrate CT are attached by a sealant to maintain the cell gap therebetween. The liquid crystal layer LQ is sealed in the cell gap between the first vertical alignment film AL1 and second vertical alignment film AL2. This liquid crystal layer LQ is composed of a liquid crystal composition with a negative dielectric constant anisotropy (negative-type).

A backlight unit BL is disposed on the back side of the liquid crystal display panel LPN having the above-described structure. Various modes are applicable to the backlight unit BL, but detailed descriptions of the backlight unit BL are omitted.

A first optical element OD1 including a first polarizer PL1 is disposed on an outer surface 10B of the first insulative substrate 10. A second optical element OD2 including a second polarizer PL2 is disposed on an outer surface 30B of the second insulative substrate 30. The first polarizer PL1 and second polarizer PL2 are disposed, for example, in a positional relationship of crossed Nicols in which their polarization axes are perpendicular to each other.

Figure 5:
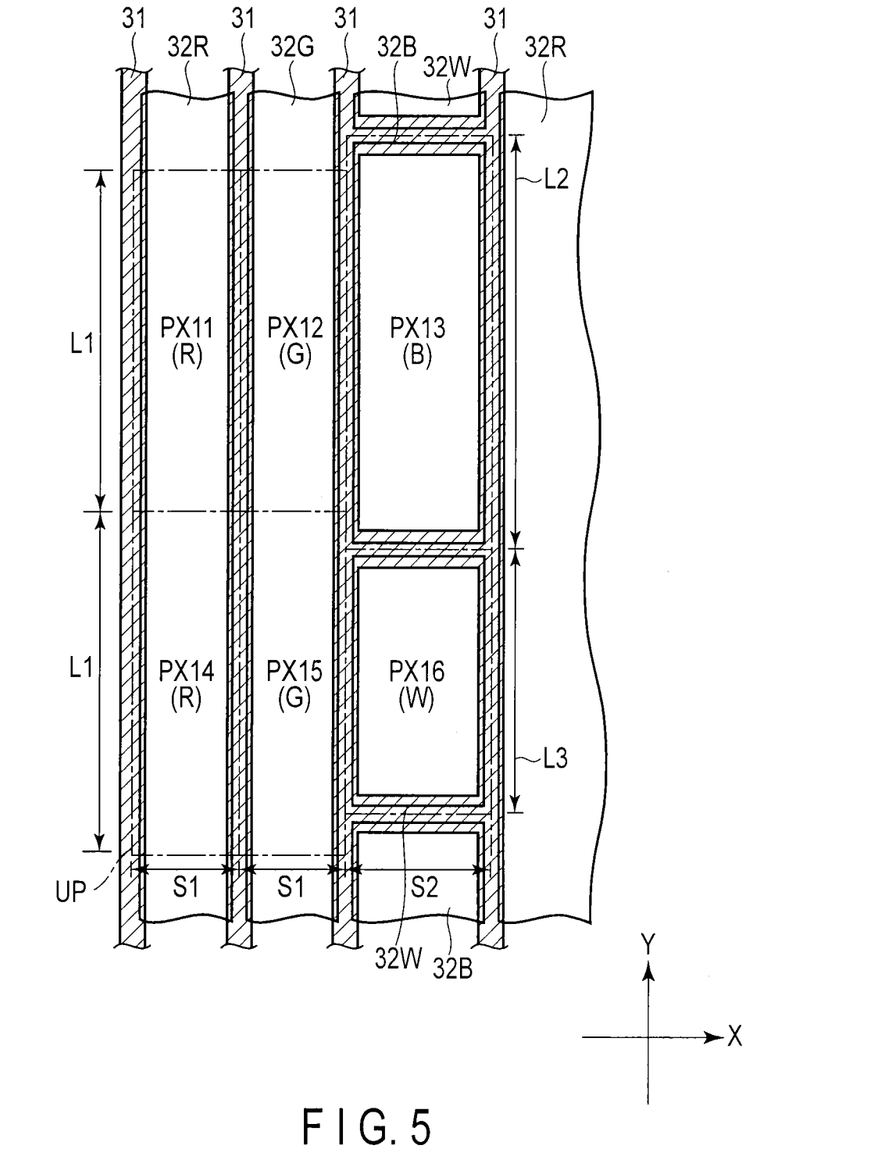
FIG. 5 is a plan view which schematically illustrates an example of a layout of pixels and color filters in the embodiment.

FIG. 5 is a plan view which schematically illustrates an example of a layout of pixels and color filters in the embodiment. In this example, the first direction X and second direction Y are perpendicular to each other.

A unit pixel for realizing color display is composed of a plurality of different color pixels. The unit pixel is a minimum unit which constitutes a color image that is displayed on the active area. In the example illustrated, the unit pixel UP is composed of six color pixels. Specifically, the unit pixel UP1 is composed of a color pixel (first color pixel) PX11, a color pixel (second color pixel) PX12, a color pixel (third color pixel) PX13, a color pixel (fourth color pixel) PX14, a color pixel (fifth color pixel) PX15 and a color pixel (sixth color pixel) PX16. In the Figure, each color pixel has a rectangular shape with a pair of short sides in the first direction X, and a pair of long sides in the second direction Y, and each color pixel is indicated by a one-dot-and-dash line. The color pixel PX11 is a red color pixel. The color pixel PX12 is a green color pixel neighboring the color pixel PX11 in the first direction X. The color pixel PX13 is a blue color pixel neighboring the color pixel PX12 in the first direction X. The color pixel PX14 is a red color pixel neighboring the color pixel PX11 in the second direction Y. The color pixel PX15 is a green color pixel neighboring the color pixel PX12 in the second direction Y. The color pixel PX16 is a white color pixel neighboring the color pixel PX13 in the second direction Y.

Each of the color pixel PX11, color pixel PX12, color pixel PX14 and color pixel PX15 has a long-side length L1 in the second direction Y. The color pixel PX13 has a long-side length L2 in the second direction Y, which is greater than the long-side length L1. The color pixel PX16 has a long-side length L3 in the second direction Y, which is less than the long-side length L1. Each of the color pixel PX11, color pixel PX12, color pixel PX14 and color pixel PX15 has a short-side length S1 in the first direction X. Each of the color pixel PX13 and color pixel PX16 has a second short-side length S2 in the first direction X, which is greater than the short-side length S1.

In this structure, the color pixel PX11, color pixel PX12, color pixel PX14 and color pixel PX15 are substantially equal in area. The area of the color pixel PX13 is greater than the area of the color pixel PX11, etc., and is largest in the unit pixel UP1. The area of the color pixel PX16 is less than the area of the color pixel PX11, etc., and is smallest in the unit pixel UP1.

Light-shield layers 31 are disposed at boundaries of the respective color pixels. Each light-shield layer 31 extends linearly in the second direction Y. Incidentally, no light-shield layer 31 is disposed at a boundary between color pixels of the same color. Specifically, no light-shield layer 31 is disposed at a boundary between the color pixel PX11 and color pixel PX14, or between the color pixel PX12 and color pixel PX15. The light-shield layer 31 is disposed at a boundary between color pixels of different colors. Specifically, the light-shield layer 31 extending linearly in the first direction X is disposed at a boundary between the color pixel PX13 and color pixel PX16. Thus, each of the color pixel PX13 and color pixel PX16 is surrounded by the light-shield layers 31.

A color filter (first color filter) 32R is formed in a strip shape extending in the second direction Y, and is disposed to correspond to the color pixel PX11 and the color pixel PX14. A color filter (second color filter) 32G neighbors the color filter 32R in the first direction X, is formed in a strip shape extending in the second direction Y, and is disposed to correspond to the color pixel PX12 and the color pixel PX15. A color filter (third color filter) 32B neighbors the color filter 32G in the first direction X, is formed in an island shape, and is disposed to correspond to the color pixel PX13. A color filter (fourth color filter) 32W neighbors the color filter 32B in the second direction Y, neighbors the color filter 32G in the first direction X, is formed in an island shape, and is disposed to correspond to the color pixel PX16. The color filter 32B and color filter 32W are alternately disposed in the second direction Y.

The color filter 32R and color filter 32G have an equal width in the first direction X. The color filter 32B and color filter 32W have an equal width in the first direction X, and this width is greater than the width of the color filter 32R, etc.

The color filter 32R is a red (R) color filter. The color filter 32G is a green (G) color filter. The color filter 32B is a blue (B) color filter. The color filter 32W is a white (W) color filter. The first to fourth color filters have mutually neighboring end portions overlapping the light-shield layers 31.

In this manner, the active area includes the color pixels of the four colors (red color pixels, green color pixels, blue color pixels, and white color pixels), and the number of color pixels of two colors (in the illustrated example, blue color pixels and white color pixels) of the four colors is half the number of color pixels of the other two colors (in the illustrated example, red color pixels and green color pixels). In addition, the long-side length of the color pixels, the number of which is smaller, is different from the long-side length of the color pixels, the number of which is larger. Furthermore, the short-side length of the color pixels, the number of which is smaller, is different from the short-side length of the color pixels, the number of which is larger.

For example, the sum of the areas of the color pixel PX11 and color pixel PX14, which are red color pixels, is equal to the sum of the areas of the color pixel PX12 and color pixel PX15, which are green color pixels, and is equal to the area of the color pixel PX13 which is blue color pixel. However, the area of each color pixel may be varied by altering the long-side length and short-side length of the color pixel in accordance with the transmittance of each of the color filter 32R which is applied to the red color pixel, the color filter 32G which is applied to green color pixel, and the color filter 32B which is applied to blue color pixel. In the case where the transmittance of the color filter 32B is higher than the transmittance of the color filter 32R and color filter 32G, the area of the color pixel PX13 may be made smaller than the sum of the areas of the color pixel PX11 and color pixel PX14 which are red color pixels.

Figure 6:
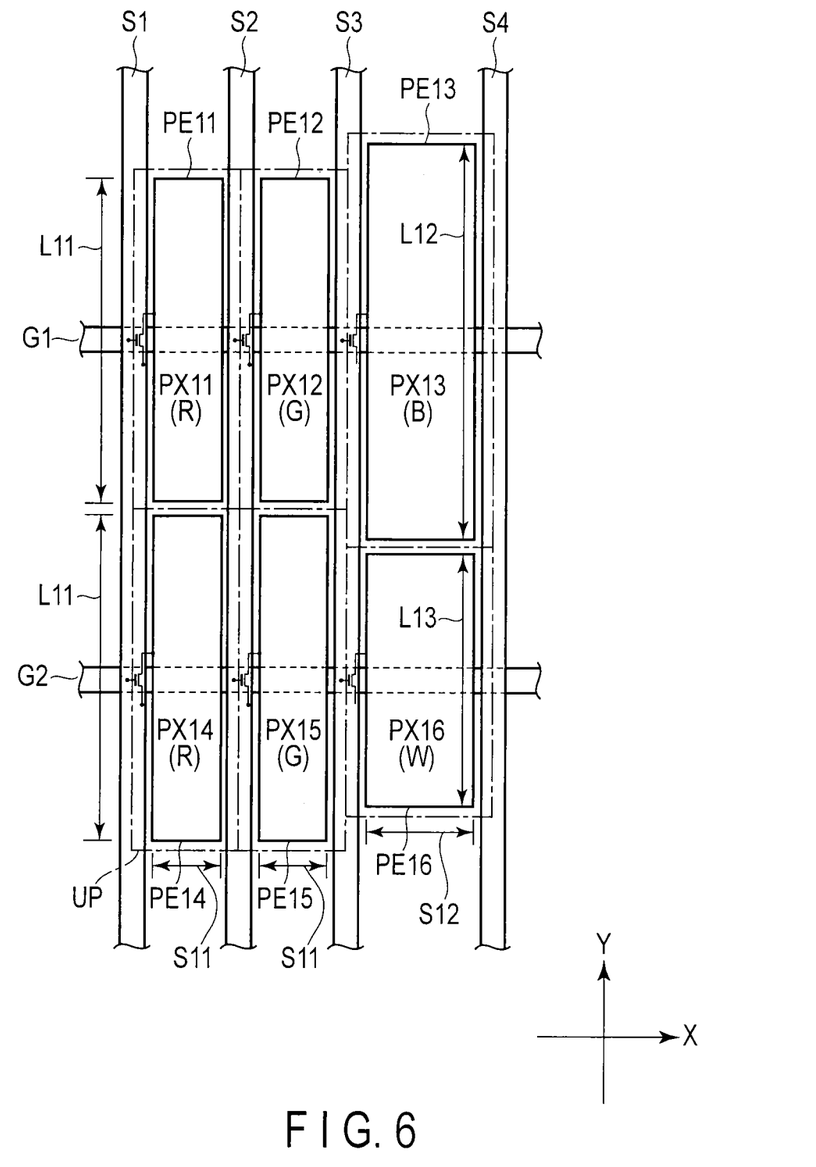
FIG. 6 is a plan view which schematically illustrates a structure example of an array substrate AR to which the color filters shown in FIG. 5 are applied.

FIG. 6 is a plan view which schematically illustrates a structure example of an array substrate AR to which the color filters shown in FIG. 5 are applied. In this example, only the structure of the array substrate AR, which is necessary for the description, is illustrated, and depiction of the first common electrode, etc. is omitted.

A gate line G1 extends in the first direction X and crosses central portions of the color pixel PX11, color pixel PX12, and color pixel PX13. A gate line G2 extends in the first direction X and crosses the central portions of the color pixel PX14, color pixel PX15, and color pixel PX16.

A pixel electrode (first pixel electrode) PE11 is disposed to correspond to the color pixel PX11, and is connected to a source line S1 via a switching element which is connected to the gate line G1. A pixel electrode (second pixel electrode) PE12 is disposed to correspond to the color pixel PX12 and neighbors the pixel electrode PE11 in the first direction X. The pixel electrode PE12 is connected to a source line S2 via a switching element which is connected to the gate line G1. A pixel electrode (third pixel electrode) PE13 is disposed to correspond to the color pixel PX13 and neighbors the pixel electrode PE12 in the first direction X. The pixel electrode PE13 is connected to a source line S3 via a switching element which is connected to the gate line G1. A pixel electrode (fourth pixel electrode) PE14 is disposed to correspond to the color pixel PX14 and neighbors the pixel electrode PE11 in the second direction Y. The pixel electrode PE14 is connected to the source line S1 via a switching element which is connected to a gate line G2. A pixel electrode (fifth pixel electrode) PE15 is disposed to correspond to the color pixel PX15 and neighbors the pixel electrode PE12 in the second direction Y. The pixel electrode PE15 is connected to the source line S2 via a switching element which is connected to the gate line G2. A pixel electrode (sixth pixel electrode) PE16 is disposed to correspond to the color pixel PX16 and neighbors the pixel electrode PE13 in the second direction Y. The pixel electrode PE16 is connected to the source line S3 via a switching element which is connected to the gate line G2.

Each of the pixel electrode PE11, pixel electrode PE12, pixel electrode PE14 and pixel electrode PE15 has a long-side length L11 in the second direction Y. The pixel electrode PE13 has a long-side length L12 in the second direction Y, which is greater than the long-side length L11. The pixel electrode PE16 has a long-side length L13 in the second direction Y, which is less than the long-side length L11. Each of the pixel electrode PE11, pixel electrode PE12, pixel electrode PE14 and pixel electrode PE15 has a short-side length S11 in the first direction X. Each of the pixel electrode PE13 and pixel electrode PE16 has a short-side length S12 in the first direction X, which is greater than the short-side length S11.

The pixel electrode PE11 and pixel electrode PE14 arranged in the second direction Y are opposed to the color filter 32R shown in FIG. 5. The pixel electrode PE12 and pixel electrode PE15 arranged in the second direction Y are opposed to the color filter 32G shown in FIG. 5. The pixel electrode PE13 is opposed to the color filter 32B shown in FIG. 5. The pixel electrode PE16 is opposed to the color filter 32W shown in FIG. 5.

Figure 7:
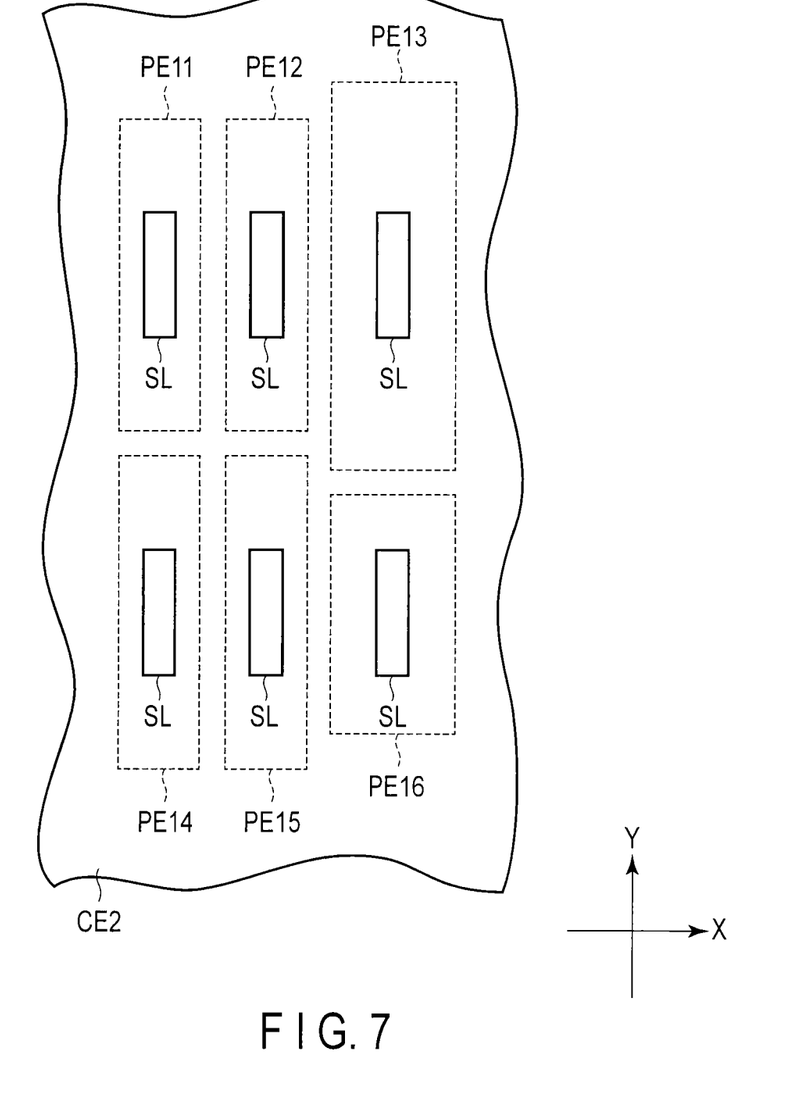
FIG. 7 is a plan view which schematically illustrates a structure example of a second common electrode CE2 disposed in a counter substrate CT opposed to the array substrate AR shown in FIG. 6.

FIG. 7 is a plan view which schematically illustrates a structure example of the second common electrode CE2 which is disposed to be opposed to the array substrate AR shown in FIG. 6.

The second common electrode CE2 is opposed to the pixel electrodes PE11 to PE16. Slits SL are formed in the second common electrode CE2 at positions opposed to the pixel electrodes PE11 to PE16, respectively. The slits SL have substantially the same shape. In the example illustrated, each slit SL has a vertically elongated shape extending in the second direction Y.

Next, the operation of the display device in the embodiment is described.

In an OFF state in which no potential difference is produced between the pixel electrode PE and the first common electrode CE1 and second common electrode CE2 (i.e. a state in which no voltage is applied to the liquid crystal layer LQ), no electric field is produced between the pixel electrode PE and second common electrode CE2. Thus, as illustrated in FIG. 4, liquid crystal molecules LM included in the liquid crystal layer LQ are initially aligned substantially perpendicular to the substrate major surface (X-Y plane) between the first vertical alignment film AL1 and second vertical alignment film AL2. In this case, part of linearly polarized light from the backlight unit BL passes through the first polarizer PL1 and enters the liquid crystal display panel LPN. The polarization state of the linearly polarized light, which enters the liquid crystal display panel LPN, hardly varies when the light passes through the liquid crystal layer LQ. Thus, the linearly polarized light emerging from the liquid crystal display panel LPN is absorbed by the second polarizer PL2 that is in the positional relationship of crossed Nicols in relation to the first polarizer PL1 (black display).

In an ON state in which a potential difference is produced between the pixel electrode PE and the first common electrode CE1 and second common electrode CE2 (i.e. a state in which a voltage is applied to the liquid crystal layer LQ), a vertical electric field or an inclined electric field avoiding the slits SL is produced between the pixel electrode PE and second common electrode CE2. Thus, the liquid crystal molecules LM are aligned in a direction which is different from the initial alignment direction, by the effect of the vertical electric field or inclined electric field. Specifically, since negative-type liquid crystal molecules LM are aligned such that their major axes cross the electric field, the liquid crystal molecules LM are aligned in the ON state in an oblique direction or in a horizontal direction, relative to the substrate major surface.

In this ON state, the polarization state of the linearly polarized light, which enters the liquid crystal display panel LPN, varies depending on the alignment state of the liquid crystal molecules LM (or the retardation of the liquid crystal layer) when the light passes through the liquid crystal layer LQ. Thus, in the ON state, at least part of the light emerging from the liquid crystal layer LQ passes through the second polarizer PL2 (white display).

In addition, in the ON state, a storage capacitance CS is formed by the pixel electrode PE and the first common electrode CE1 that are opposed to each other via the fourth insulating film 14, and retains a necessary capacitance for displaying an image. Specifically, a pixel potential, which has been written to each pixel via the switching element SW, is retained in the storage capacitance CS for a predetermined period.

Here, in the VA mode, the hue of the liquid crystal layer LQ changes depending on the alignment of liquid crystal molecules LM affected by optical rotatory dispersion (or wavelength dispersion) in the liquid crystal layer LQ. That is, although the liquid crystal layer LQ itself is originally transparent, the alignment of liquid crystal molecules LM may change the color of the liquid crystal layer LQ bluish. Thus, in order to maintain a white balance, a voltage value is adjusted to correspond to the gradation values in the pixels of each of the primary colors of red, green and blue. On the other hand, the bluish color of the liquid crystal layer LQ itself appears conspicuously in the white color pixels and it is not sufficiently suppressed by adjusting the chromaticity of the other color pixels.

Figure 8:
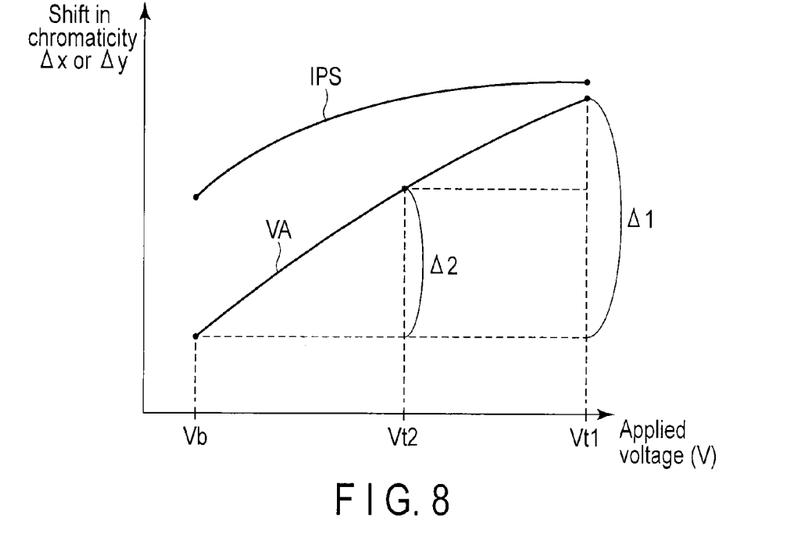
FIG. 8 is a view which conceptually illustrates a chromaticity shift relative to applied voltages in white color pixels.

FIG. 8 is a view which conceptually illustrates a shift in chromaticity relative to applied voltages in white color pixels.

The horizontal axis of the graph indicates voltage applied to the liquid crystal layer LQ, and the vertical axis of the graph indicates shift $\Delta x$ in coordinate x and shift $\Delta y$ in coordinate y in the chromaticity diagram. Note that shift $\Delta x$ and shift $\Delta y$ do not always agree but vary in a similar manner.

In the VA mode, if the voltage value applied to the white color pixels is set to correspond to each gradation value within the same voltage range as that of red and green color pixels and is changed from top voltage Vt1 corresponding to the maximum gradation value 255 (white) to bottom voltage Vb corresponding to minimum gradation value 0 (black), both shifts $\Delta x$ and $\Delta y$ significantly decline. That is, if the voltage value applied to the liquid crystal layer LQ is changed from top voltage Vt1 to bottom voltage Vb, the chromaticity of the white color pixels shifts greatly from white to blue in the chromaticity diagram. This phenomenon is referred to as the blue shift.

For example, a comparative example was prepared to have a voltage range of 4.6 V in which bottom voltage Vb is 0 and top voltage Vt1 is 4.6 V was set in all of red, green, blue and white color pixels, and the voltage value was changed therein from top voltage Vt1 to bottom voltage Vb. Consequently, it showed shift n1 in the chromaticity in the white color pixels.

Note that the Figure shows a shift in the chromaticity relative to the applied voltage to white color pixels in the IPS mode for reference purpose only. In the IPS mode, if the voltage value is changed from top voltage Vt1 to bottom voltage Vb with the same voltage setting as in the VA mode, the shift in the chromaticity in the white color pixels is less than that of the VA mode. From this point, it is acknowledged that the VA mode has the property of showing the blue shift more conspicuously than the IPS mode.

Therefore, in the embodiment, the top voltage applied to the white color pixels corresponding to the maximum gradation value is set less than the top voltage applied to each of red and green color pixels corresponding to the maximum gradation value. For example, as illustrated in the Figure, the top voltage of each of red and green color pixels is set to voltage value Vt1 while the top voltage of the white color pixels is set to voltage value Vt2. The bottom voltage is set to Vb in the Figure in every pixel. That is, the voltage range allocated to the gradation values from the minimum to the maximum in the red and green color pixels is a range of bottom voltage Vb to top voltage Vt1 while the voltage range allocated to gradation values from the minimum to the maximum in the white color pixels is a range of bottom voltage Vb to top voltage Vt2, which is less than that of each of red and green color pixels.

In this voltage setting, if the voltage value is changed from top voltage Vt2 to bottom voltage Vb in the white color pixels, the shift in the chromaticity therein is maintained as Δ2 which is less than Δ1. In other words, by setting the top voltage and the voltage range of the white color pixels to be less than those of the red and green color pixels, the blue shift in the white color pixels can be suppressed.

For example, example 1 was prepared to have a voltage range of 4.6 V in which bottom voltage Vb is 0 and top voltage Vt1 is 4.6 V was set in the red, green, and blue color pixels and a voltage range of 3.5 V in which bottom voltage Vb is 0 and top voltage Vt2 is 3.5 V in the white color pixels. The voltage value was changed while a white image was being displayed on the active area and the changes in the chromaticity were measured by a chromaticity meter. Consequently, example 1 showed a chromaticity change which is less than that in the comparative example, and was proved to be able to suppress the blue shift.

Note that, if the top voltage is set to Vt2 which is less than Vt1 in the white color pixels, the chromaticity shifts to blue by a difference therebetween (Δ1−Δ2). Such a difference in the chromaticity can be compensated by, for example, adjusting a cell gap pixel by pixel, or can be compensated by a hue of a color filter applied to the white color pixels (for example, yellow which is a complementary color of blue).

The above-mentioned blue shift is a phenomenon in which the liquid crystal layer LQ itself is colored bluish and it is observed not only in the white color pixels but also in the red, green and blue color pixels. Thus, the same method used for the white color pixels can be applied to the blue color pixels.

Specifically, not only as to the white color pixels, the top voltage applied to the blue color pixels corresponding to the maximum gradation value may also be set less than the top voltage applied to each of red and green color pixels corresponding to the maximum gradation value. For example, as illustrated in the Figure, the top voltage of each of red and green color pixels is set to voltage value Vt1 while the top voltage of each of white and blue color pixels is set to voltage value Vt2. The bottom voltage is set to Vb in the Figure in every pixel. That is, the voltage range allocated to gradation values from the minimum to the maximum in the white and blue color pixels is a range of bottom voltage Vb to top voltage Vt2, which is less than that of each of red and green color pixels.

In this voltage setting, if the voltage value is changed from top voltage Vt2 to bottom voltage Vb in the white and blue color pixels, the blue shift in the white and blue color pixels can be suppressed. For example, example 2 was prepared to have a voltage range of 4.6 V in which bottom voltage Vb is 0 and top voltage Vt1 is 4.6 V was set in the red and green color pixels and a voltage range of 3.5 V in which bottom voltage Vb is 0 and top voltage Vt2 is 3.5 V in the white and blue color pixels. The voltage value was changed while a white image was being displayed on the active area and the changes in the chromaticity were measured by a chromaticity meter. Consequently, Example 2 showed a chromaticity change which is less than that of example 1, and was proved to be able to further suppress the blue shift.

As can be understood from the above, in the embodiment, a shift in the chromaticity caused by a voltage applied to a liquid crystal layer can be suppressed. Furthermore, since a unit pixel is composed of four color pixels of red, green, blue and white, the display luminance per unit pixel can be improved as compared to a case where a unit pixel is composed of three color pixels of red, green, and blue. In addition, by substituting the display luminance of the white color pixels for the total display luminance produced by the red, green and blue color pixels, the display luminance of the unit pixels increases. Thus, the luminance of the backlight unit can be reduced by that degree, and the power consumption can be reduced. Furthermore, by virtue of the high luminance of the unit pixels, the visibility of a display image can be enhanced even in ambient light. In addition, since the pixel size of the white color pixel does not excessively increase, the white color pixels themselves are less easily discernible even when an image with a high display luminance is displayed by the white color pixels. Therefore, the display quality can be improved.

According to the embodiment, the capacitance, which is necessary for displaying an image in each pixel, can be formed by the pixel electrode PE and first common electrode CE1 which are opposed via the fourth insulating film 14. Thus, when the capacitance is formed, a wiring line or electrode, which crosses the pixel and is formed of a light-shielding wiring material, is unnecessary. In addition, the fourth insulating film 14 is formed to have a smaller film thickness than the third insulating film that is formed of a resin material or the like. Therefore, a relatively large capacitance can easily be formed by the pixel electrode PE and first common electrode CE1 which are disposed via the fourth insulating film 14.

Moreover, since each of the pixel electrode PE and first common electrode CE1 is formed of a transparent, electrically conductive material, an area overlapping the pixel electrode PE and first common electrode CE1 contributes to display. Thus, compared to a comparative example in which a storage capacitance line crossing the pixel is disposed, the aperture ratio, transmittance or luminance per pixel, which contributes to display, can be improved. Therefore, while the capacitance necessary for display is secured, the display quality can be improved.

In addition, the first common electrode CE1 extends above the source line S1 and source line S2. Thus, in the ON state, an undesired leak electric field from the source line toward the liquid crystal layer LQ can be shielded by the first common electrode CE1. Specifically, it is possible to suppress formation of an undesired electric field or an undesired capacitance between the source line and the pixel electrode PE or second common electrode CE2, and to suppress disturbance in alignment of liquid crystal molecules LM in an area overlapping the source line.

Furthermore, the liquid crystal molecules LM in the area overlapping the source line maintains the initial alignment state even in the ON state, since the first common electrode CE1 and second common electrode CE2 are kept at the same potential. Therefore, pixel electrodes PE neighboring in the first direction X can be located closer to each other up to a processing limit, and the area which contributes to display per pixel can be further increased.

In addition, even when one of the pixels neighboring with the source line interposed is in the ON state and the other is in the OFF state, no potential difference occurs by means of the first common electrode CE1 and second common electrode CE2, in the liquid crystal layer on the source line between the ON-state pixel and OFF-state pixel. Thus, the liquid crystal molecules LM in the area overlapping the source line are kept in the initial alignment state. Therefore, even when the liquid crystal display panel LPN is viewed in an oblique direction, degradation in display quality due to color mixing can be suppressed. In addition, since there is no need to increase the width of the light-shield layer 31 in order to prevent color mixing, the area contributing to display per pixel can be further increased.

Next, modifications will be described.

Figure 9:
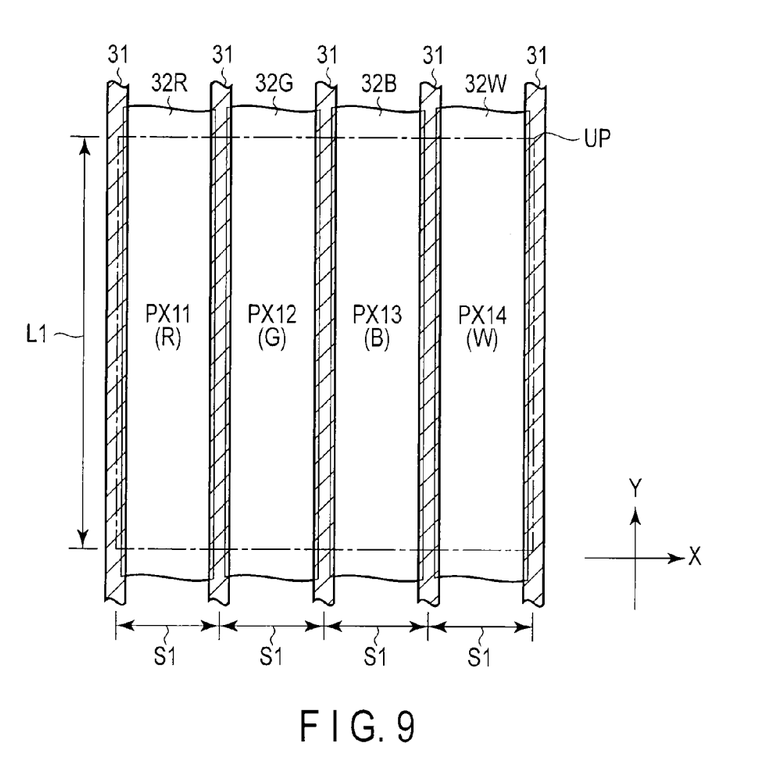
FIG. 9 is a plan view which schematically illustrates another structure example of a layout of pixels and color filters in the embodiment.

FIG. 9 is a plan view which schematically shows another structure example of a layout of pixels and color filters in the embodiment.

The structure example shown in FIG. 9 differs from the structure example shown in FIG. 5 in respect of the unit pixel UP composed of four color pixels. That is, the unit pixel UP is composed of a color pixel (first color pixel) PX11, a color pixel (second color pixel) PX12, a color pixel (third color pixel) PX13, and a color pixel (fourth color pixel) PX14. The color pixel PX11 is a red color pixel. The color pixel PX12 is a green color pixel neighboring the color pixel 11 in the first direction X. The color pixel PX13 is a blue color pixel neighboring the color pixel PX12 in the first direction X. The color pixel PX14 is a white color pixel neighboring the color pixel PX13 in the first direction X.

Each of the color pixel PX11, color pixel PX12, color pixel PX13, and color pixel PX14 has a long-side length L1 in the second direction Y and a short-side length S1 in the first direction X. Light-shield layers 31 are disposed at boundaries of the respective color pixels. Each light-shield layer 31 extends linearly in the second direction Y.

A color filter (first color filter) 32R is a red (R) color filter disposed to correspond to the color pixel PX11. A color filter (second color filter) 32G is a green (G) color filter disposed to correspond to the color pixel PX12. A color filter (third color filter) 32B is a blue (B) color filter disposed to correspond to the color pixel PX13. A color filter (fourth color filter) 32W is a white (W) color filter disposed to correspond to the color pixel PX14.

In such a layout, too, by using the same voltage setting as in the above-described example, the same advantageous effects therein can be obtained.

Figure 10:
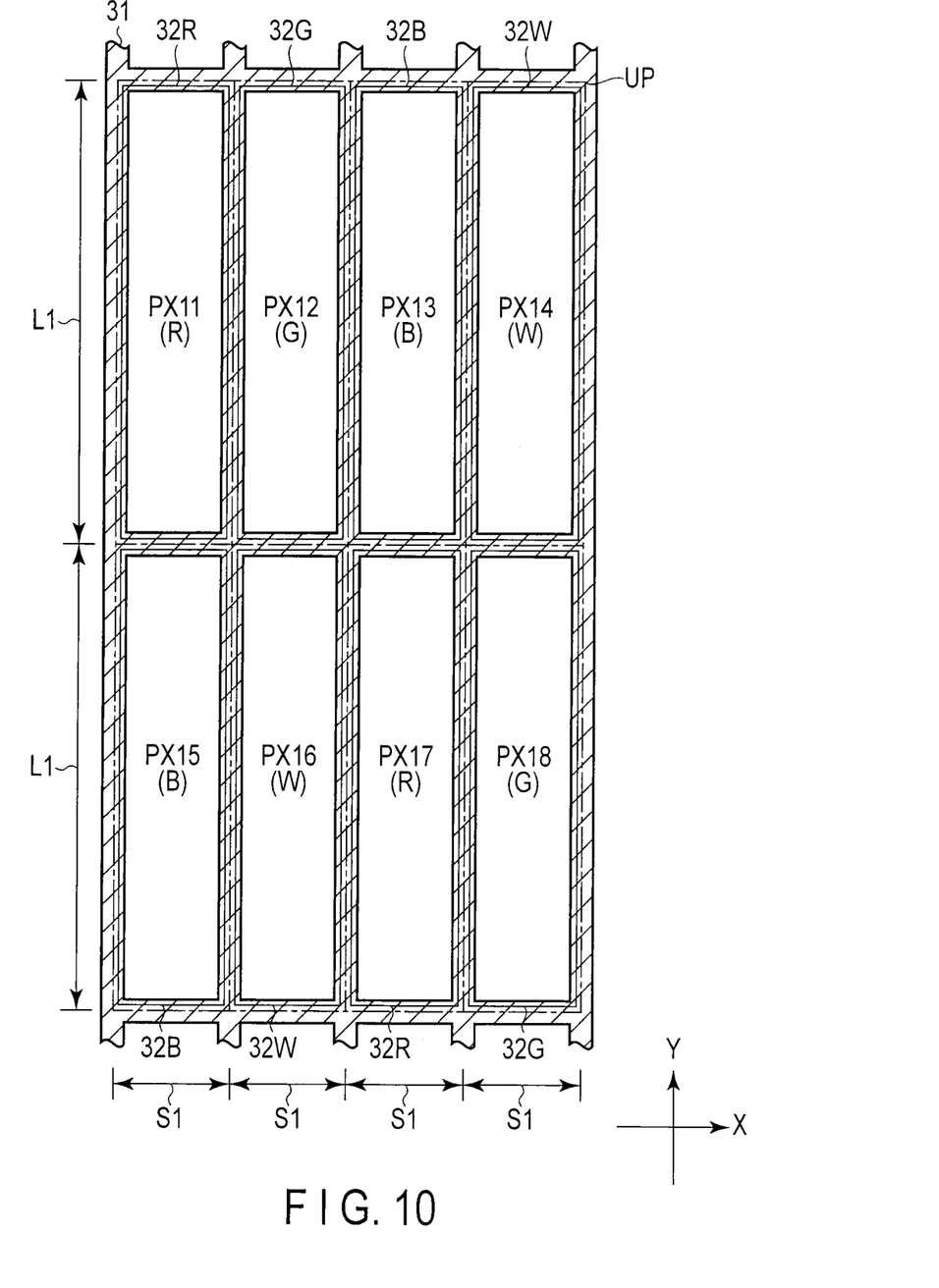
FIG. 10 is a plan view which schematically illustrates another structure example of a layout of pixels and color filters in the embodiment.

FIG. 10 is a plan view which schematically shows another structure example of a layout of pixels and color filters in the embodiment.

The structure example shown in FIG. 10 differs from the structure example shown in FIG. 5 in respect of the unit pixel UP composed of eight color pixels. That is, the unit pixel UP is composed of a color pixel (first color pixel) PX11, a color pixel (second color pixel) PX12, a color pixel (third color pixel) PX13, a color pixel (fourth color pixel) PX14, a color pixel (fifth color pixel) PX15, a color pixel (sixth color pixel) PX16, a color pixel (seventh color pixel) PX17, and a color pixel (eighth color pixel) PX18. The color pixel (first color pixel) PX11, color pixel (second color pixel) PX12, color pixel (third color pixel) PX13, and color pixel (fourth color pixel) PX14 are aligned in this order in the first direction X. The color pixel (fifth color pixel) PX15, color pixel (sixth color pixel) PX16, color pixel (seventh color pixel) PX17, and color pixel (eighth color pixel) PX18 are aligned in this order in the first direction X. The color pixels PX11 and PX17 are red color pixels. The color pixels PX12 and PX18 are green color pixels. The color pixels PX13 and PX15 are blue color pixels. The color pixels PX14 and PX16 are white color pixels. Light-shield layers 31 are disposed at boundaries of the respective color pixels.

A color filter (first color filter) 32R is a red (R) color filter disposed to correspond to the color pixel PX11. A color filter (second color filter) 32G is a green (G) color filter disposed to correspond to the color pixel PX12. A color filter (third color filter) 32B is a blue (B) color filter disposed to correspond to the color pixel PX13. A color filter (fourth color filter) 32W is a white (W) color filter disposed to correspond to the color pixel PX14. A color filter (fifth color filter) 32B is a blue (B) color filter disposed to correspond to the color pixel PX15. A color filter (sixth color filter) 32W is a white (W) color filter disposed to correspond to the color pixel PX16. A color filter (seventh color filter) 32R is a red (R) color filter disposed to correspond to the color pixel PX17. A color filter (eighth color filter) 32G is a green (G) color filter disposed to correspond to the color pixel PX18.

In such a layout, too, by using the same voltage setting as in the above-described example, the same advantageous effects therein can be obtained.

As has been described above, according to the present embodiment, a display device, which can improve display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate including a first pixel electrode disposed on a first color pixel of red, a second pixel electrode disposed on a second color pixel of green, a third pixel electrode disposed on a third color pixel of blue, and a fourth pixel electrode disposed on a fourth color pixel of white;
   a second substrate including a common electrode which is opposed to the first, second, third, and fourth pixel electrodes; and
   a liquid crystal layer held between the first substrate and the second substrate,
   wherein a top voltage applied to the fourth color pixel to correspond to a maximum gradation value is set to be less than a top voltage applied to each of the first color pixel and the second color pixel to correspond to respective maximum gradation values.

2. The display device of claim 1, wherein a voltage range of a minimum gradation value to a maximum gradation value of the fourth color pixel is set to be less than a voltage range of a minimum gradation value to a maximum gradation value of each of the first color pixel and the second color pixel.

3. The display device of claim 1, wherein a top voltage applied to the third color pixel to correspond to a maximum gradation value is set to be less than the top voltage applied to each of the first color pixel and the second color pixel to correspond to the respective maximum gradation values.

4. The display device of claim 3, wherein a voltage range of a minimum gradation value to a maximum gradation value of the third color pixel is set to be less than the voltage range of the minimum gradation value to the maximum gradation value of each of the first color pixel and the second color pixel.

5. The display device of claim 1, wherein the first color pixel, the second color pixel, and the third color pixel are aligned in the order stated in a first direction, and the third color pixel and the fourth color pixel are aligned in a second direction which is perpendicular to the first direction.

6. The display device of claim 5, wherein the first substrate further comprises a fifth pixel electrode disposed on a fifth color pixel of red which is adjacent to the first color pixel in the second direction, and a sixth pixel electrode disposed on a sixth color pixel of green which is adjacent to the second color pixel in the second direction.

7. The display device of claim 1, wherein the first color pixel, the second color pixel, the third color pixel, and the fourth color pixel are aligned in the order stated in the first direction.

8. The display device of claim 7, wherein the first substrate further includes a fifth pixel electrode disposed on a fifth color pixel of blue which is adjacent to the first color pixel in the second direction, a sixth pixel electrode disposed on a sixth color pixel of white which is adjacent to the second color pixel in the second direction, a seventh pixel electrode disposed on a seventh color pixel of red which is adjacent to the third color pixel in the second direction, and eighth pixel electrode disposed on a eighth color pixel of green which is adjacent to the fourth color pixel in the second direction.

9. A display device comprising:
a first substrate including a first common electrode, an interlayer insulating film covering the first common electrode, a first pixel electrode disposed on a first color pixel of red on the interlayer insulating film, a second pixel electrode disposed on a second color pixel of green on the interlayer insulating film, a third pixel electrode disposed on a third color pixel of blue on the interlayer insulating film, and a fourth pixel electrode disposed on a fourth color pixel of white on the interlayer insulating film;
a second substrate including a second common electrode which is opposed to the first pixel electrode, the second pixel electrode, the third pixel electrode, and the fourth pixel electrode; and
a liquid crystal layer held between the first substrate and the second substrate,
wherein a top voltage applied to the fourth color pixel to correspond to a maximum gradation value is set to be less than a top voltage applied to each of the first color pixel and the second color pixel to correspond to respective maximum gradation values.

10. The display device of claim 9, wherein a voltage range of a minimum gradation value to a maximum gradation value of the fourth color pixel is set to be less than a voltage range of a minimum gradation value to a maximum gradation value of each of the first color pixel and the second color pixel.

11. The display device of claim 9, wherein a top voltage applied to the third color pixel to correspond to a maximum gradation value is set to be less than the top voltage applied to each of the first color pixel and the second color pixel to correspond to the respective maximum gradation values.

12. The display device of claim 11, wherein a voltage range of a minimum gradation value to a maximum gradation value of the third color pixel is set to be less than the voltage range of the minimum gradation value to the maximum gradation value of each of the first color pixel and the second color pixel.

13. The display device of claim 9, wherein the first color pixel, the second color pixel, and the third color pixel are aligned in the order stated in a first direction, and the third color pixel and the fourth color pixel are aligned in a second direction which is orthogonal to the first direction.

14. The display device of claim 13, wherein the first substrate further comprises a fifth pixel electrode disposed on a fifth color pixel of red which is adjacent to the first color pixel in the second direction, and a sixth pixel electrode disposed on a sixth color pixel of green which is adjacent to the second color pixel in the second direction.

15. The display device of claim 9, wherein the first color pixel, the second color pixel, the third color pixel, and the fourth color pixel are aligned in the order stated in the first direction.

16. The display device of claim 15, wherein the first substrate further includes a fifth pixel electrode disposed on a fifth color pixel of blue which is adjacent to the first color pixel in the second direction, a sixth pixel electrode disposed on a sixth color pixel of white which is adjacent to the second color pixel in the second direction, a seventh pixel electrode disposed on a seventh color pixel of red which is adjacent to the third color pixel in the second direction, and eighth pixel electrode disposed on a eighth color pixel of green which is adjacent to the fourth color pixel in the second direction.

17. The display device of claim 9, wherein the first substrate further comprises a first vertical alignment film covering the first to fourth pixel electrodes, the second substrate further includes a second vertical alignment film covering the common electrode, and the liquid crystal layer is held between the first vertical alignment film and the second vertical alignment film.

18. The display device of claim 9, wherein the interlayer insulating film is formed of an inorganic material.

* * * * *